United States Patent

Salmon

[11] Patent Number: 5,287,127
[45] Date of Patent: Feb. 15, 1994

[54] ELECTROSTATIC PRINTING APPARATUS AND METHOD

[76] Inventor: Peter C. Salmon, 70 Angela Dr., Los Altos, Calif. 94022

[21] Appl. No.: 842,004

[22] Filed: Feb. 25, 1992

[51] Int. Cl.$^5$ ............... G01D 15/06; G03G 15/01
[52] U.S. Cl. ................................ 346/154; 346/157; 355/326 R
[58] Field of Search ............... 346/154, 157; 355/326

[56] References Cited

U.S. PATENT DOCUMENTS

| | | | |
|---|---|---|---|
| 3,689,935 | 9/1972 | Pressman et al. | 346/74 |
| 3,778,678 | 12/1973 | Masuda . | |
| 3,872,361 | 3/1975 | Masuda . | |
| 4,491,855 | 1/1985 | Fujii et al. | 346/159 |
| 4,568,955 | 2/1986 | Hosoya et al. | 346/153.1 |
| 4,653,426 | 3/1987 | Kohyama . | |
| 4,743,926 | 5/1988 | Schmidlin et al. | 346/159 |
| 4,743,938 | 5/1988 | Ohno . | |
| 4,777,500 | 10/1988 | Salmon | 346/157 X |
| 4,876,561 | 10/1989 | Schmidlin | 346/159 |
| 4,876,575 | 10/1989 | Hays . | |
| 4,912,489 | 3/1990 | Schmidlin | 346/159 |
| 5,132,708 | 7/1992 | Schmidlin et al. | 346/157 |
| 5,153,617 | 10/1992 | Salmon | 346/157 X |

*Primary Examiner*—George H. Miller, Jr.
*Attorney, Agent, or Firm*—Flehr, Hohbach, Test, Albritton & Herbert

[57] ABSTRACT

An electronic printing apparatus employs a digitally controlled toner conveyor and large scale integrated circuits (ICs) controlling write electrodes to print monocomponent toners on plain paper in a single pass. The ICs convert high level image information into toner controlling pulses. Pixel intensity is programmed by associating a counted number of packets of toner with each level of pixel depth.

23 Claims, 10 Drawing Sheets

ELECTROSTATIC PRINTING APPARATUS AND METHOD

BRIEF DESCRIPTION OF THE INVENTION

This invention relates to electrostatic printing apparatus and method and more particularly to digitally controlled apparatus and methods for delivering monocomponent toners in color image configuration onto plain paper substrates.

BACKGROUND OF THE INVENTION

Of the various electrostatic printing methods, electrophotography has dominated high resolution monochrome printing for several decades. The electrophotographic process includes uniformly coating a photoconductive surface with charge, selectively exposing the charged surface with light to form a latent image, developing the latent image by causing charged toner particles to come in contact with it, transferring the image to a receiving sheet, and fixing the image. This printing method has produced high quality printing and has been refined to effectively service a broad range of printing applications. However it is mechanically complex, requires precision optical components, and has proven difficult to adapt to color printing.

Direct Electrostatic Printing (DEP) can be simpler than electrophotographic printing. In U.S. Pat. No. 3,689,935 Pressman et al disclose a DEP device in which toner is deposited directly through apertures onto a plain paper substrate in image configuration. This method has been improved by Schmidlin in U.S. Pat. No. 4,912,489 issued Mar. 27, 1990 in which a control voltage as low as 100 V is sufficient to modulate the flow of toner through the apertures. The Schmidlin device employs a travelling wave conveyor to present toner to the printhead apertures. Generally, DEP processes have used single component insulating toners, and this has helped to simplify printing systems compared with prior two-component toner systems. The DEP devices do not require optics for the exposure step, nor do they require a photoconductive surface. Thus the printing process has been simplified. However, the apertures in the prior art DEP printers discussed above are subject to clogging arising from toner agglomeration. Additionally, ambient dust may clog an aperture. In either case, repair of a clogged aperture is difficult and costly. DEP line printers generally use multiple lines of apertures, for example four lines. The multiple lines of apertures are the result of manufacturing considerations relating to the apertures which are formed in a supporting member, with space provided for metal electrodes surrounding each electrode. This arrangement requires separating a pixel line of monochrome image data into data subsets, each subset corresponding to a line of apertures and their associated electrodes. Each data subset must be printed at a different time, with paper advances in between, in order that the original pixel line is reconstructed as a single line on the paper. Color printing generally requires the superposition of multiple monochrome images, and is more complex.

Travelling wave devices have been used to move particles along a tubular duct of insulating material. U.S. Pat. No. 3,778,678 issued to Masuda describes such a device which has three elongated electrodes spirally wound along its outer surface, uniformly spaced from one another. The electrodes are connected with the terminals of an alternating current source having a voltage of the order of 5-10 kV to produce a wave-like electric field within the duct by which particles are repelled from the inner duct surface and repulsively propelled along the duct. It is an object of the Masuda device to levitate the particles near the center of the tube, so that they do not make contact with the tube walls. A similar Masuda device is disclosed in U.S. Pat. No. 3,872,361 which discloses annular electrodes as well as elongated electrodes.

In U.S. Pat. No. 4,743,926 Schmidlin et al disclose a toner/developer delivery system that includes a pair of charged toner conveyors which are supported in face-to-face relation. A bias voltage is applied across the two conveyors to cause toner of one charge polarity to be attracted to one of the conveyors while toner of the opposite polarity is attracted to the other conveyor. Another embodiment includes a single charged toner conveyor supplied by a pair of three-phase AC current generators which are biased by a DC source which causes toner of one polarity to travel in one direction on the electrode array while toner of the opposite polarity travels generally in the opposite direction. In U.S. Pat. No. 4,876,561, also issued to Schmidlin, the charged toner conveyor may have over 400 electrodes per inch to enable a high toner delivery rate without risk of air breakdown.

U.S. Pat. No. 4,491,855 issued to Fujii at al, discloses an improved device for delivering charged particles to the vicinity of imaging electrodes. The improvement lies in that the charged particles are supported on a supporting member and an alternating electric field is applied between the supporting member and the control electrode. In U.S. Pat. No. 4,568,955 Hosoya et al disclose a recording apparatus using a toner-fog generated by electric fields applied to electrodes on the surface of a developer carrier. The electric fields are produced by an AC and a DC source connected to the electrodes, causing oscillations of the developer which generates the toner fog. U.S. Pat. No. 4,653,426 issued to Kohyama discloses the improvement of an AC voltage whose frequency varies with time. The voltage is applied to the gap between a toner carrying surface and a drum whose surface contains an electrostatic latent image. The multiple frequencies increase the toner particle jumping probabilities, thus improving gradation and denseness properties of the resulting developed image.

U.S. Pat. No. 4,876,575 issued to Hays discloses an apparatus for dynamic toner metering and charging of nonmagnetic single component toner. The apparatus includes a flexible rotating rod having an electric bias applied thereto, and the rod is in a self-spaced relationship to a rigid donor roll. The apparatus effectively creates a monolayer of charged toner on the donor roll.

The author's co-pending application, Ser. No. 07/658,397 filed Feb. 20, 1991 is incorporated herein by reference. It describes multiphase clocks applied to a linear array of electrodes to implement an imaging conveyor; toner delivered to each pixel site on the receiving sheet can be individually controlled by application of voltages to the electrodes. However, the imaging conveyor in the co-pending application uses dense multilayer thin film circuits which may be expensive to manufacture. By comparison, the present invention requires only a single toner conveyor for full color printing, most of the thin film circuitry is single layer, and the thin film circuits are less dense for a given print resolution. Furthermore, only one integrated circuit driver is required for each pixel site.

OBJECTS AND SUMMARY OF THE INVENTION

It is an object of the present invention to provide a printing apparatus and method for printing a color or black and white image on plain paper substrates at high speed, using simple parts and processes.

It is a further object to provide an electronic printing apparatus and method which can modulate the depth of toner in each pixel position with high accuracy and at high speed.

It is a further object of the invention to provide an electronic apparatus and method for printing a full color image with a single pass of the receiving sheet past a single writing head, thus simplifying the printing process compared with printing methods that require four-color separations or multiple writing heads to achieve a full range of colors.

It is a further object to provide a digitally controlled imaging apparatus which offers both high speed and precision at low cost, for example by performing digital imaging algorithms with large scale integrated circuits.

It is another object of the invention to provide a print engine which is compact in size, light in weight, and quiet in operation.

A further object of the invention is to provide a print engine that has the flexibility to print color images interspersed with black and white images without stopping to change toner cartridges.

It is a further object to avoid contamination of the human environment during printing operations by using dry toners which do not produce toxic vapors such as might be produced by evaporation of solvent from a liquid toner.

The foregoing and other objects of the invention are achieved by an electronic printing apparatus that is digitally controlled. The apparatus includes toner charging assemblies, toner loading assemblies, a toner conveyor, a writing head, a corona charging device, and a fixing assembly. Toner feeds into charging assemblies wherein friction is applied to impart a triboelectric charge on the toner particles using methods known in the art. The preferred embodiment has four sets of toner charging assemblies and toner loading assemblies, one for each of the four process colors: cyan, yellow, magenta, and black. The objective of each of the charging assemblies is to produce a monolayer of charged toner on a donor roll. The toner loading assembly comprises a dc bias supply plus a programmable square wave generator. When the square wave generator is active, toner loading may be achieved wherein toner is loaded from the donor roll onto electrodes of the toner conveyor. When the square wave generator is inactive, the donor roll and the toner conveyor electrodes are decoupled, allowing loaded toner to step around the conveyor without interaction with unloaded toner on the donor rolls. The toner conveyor has elongated conveyor electrodes that extend the full printing width of the receiving sheet and are closely spaced, approximately 50 microns apart, so that low voltages of the order of 20 volts applied to the electrodes will be effective in jumping toner from one electrode to the next. The conveyor electrodes are driven by a three phase digital clock that can be started, stopped, paused or reversed, depending on the desired motion of toner packets moving over the surface of the toner conveyor. The toner conveyor is loaded with stripes of toner of each color, which are then moved electronically, by application of a single programmable three phase clock, until toner of the desired color is presented to the writing head. In the preferred embodiment, the writing head includes an electrode for each pixel site to be printed. Each electrode is driven from an integrated circuit whose function is to convert high level image data into image writing pulses. An imaging cycle includes a single write pulse in the preferred embodiment. Each write pulse pulls a small number of toner particles off a toner conveyor electrode, such that they adhere to write electrodes. This small number of toner particles, two particles in the preferred embodiment, is defined as a write packet. Then the voltage on the write electrodes is switched to repel the toner particles, whereupon the toner particles leave the write electrodes and are attracted onto corresponding pixel sites on the receiving sheet, under the influence of a transfer charge applied to the back side of the paper by the corona charging device. The method of corona charging the back side of the paper, and subsequent transfer of the toner particles to the paper is known in the art. In the preferred embodiment, a write packet is sized to provide one 64th of the quantity of toner required to saturate the target pixel site with toner of that color. Sixty-four levels of toner of each of four colors are required to implement a color hardcopy with 24 bit color, comprising 16.7 million possible color combinations at each pixel location. As will be described, loading of toner onto the conveyor occurs concurrently with imaging cycles. A print cycle is defined as 63 imaging cycles for each of the four colors. A minimum of 0 and a maximum of 63 write packets of toner can be delivered to pixel sites during the print cycle. After each print cycle, programmed amounts of toner of each color have been accumulated at pixel sites on the receiving sheet, with the four colors superimposed. If a pixel site does not require more toner, then no write pulse is applied to the corresponding write electrode during the imaging cycle, and no write packet of toner is transferred to the receiving sheet. After a print cycle is completed, the receiving sheet is stepped by one pixel position, ready to image the next line of pixels. By alternating print cycles and paper steps, a two dimensional image is created on the receiving sheet. The imaged toner on the receiving sheet is transported through a fuser comprising a pair of rollers that apply pressure and heat to fix the image, as is known in the art. After a full page has been imaged and fused the receiving sheet is ejected from the marking engine, similarly to existing laser print engines.

The present invention is a color printing apparatus for printing on an image receiving member comprising: multiple sources of toner particles; multiple toner charging means, multiple toner loading means, a particle conveyor means that conveys toner particles from loading points adjacent the charging means to an imaging point opposite a writing head; means to attract particles from the conveyor to write electrodes on the writing head; means for presenting the image receiving member to the writing head; means to transfer particles from the write electrodes to corresponding pixel sites on the image receiving member; and means for applying and controlling voltages to the loading means, the conveyor means, and the write electrodes to deliver a predetermined amount of toner to each of said corresponding pixel sites on the image receiving member.

BRIEF DESCRIPTION OF THE DRAWINGS

The invention will be understood from the descriptions to follow when read in connection with the accompanying drawings of which.

DETAILED DESCRIPTION OF THE PREFERRED EMBODIMENT

Figure 1:
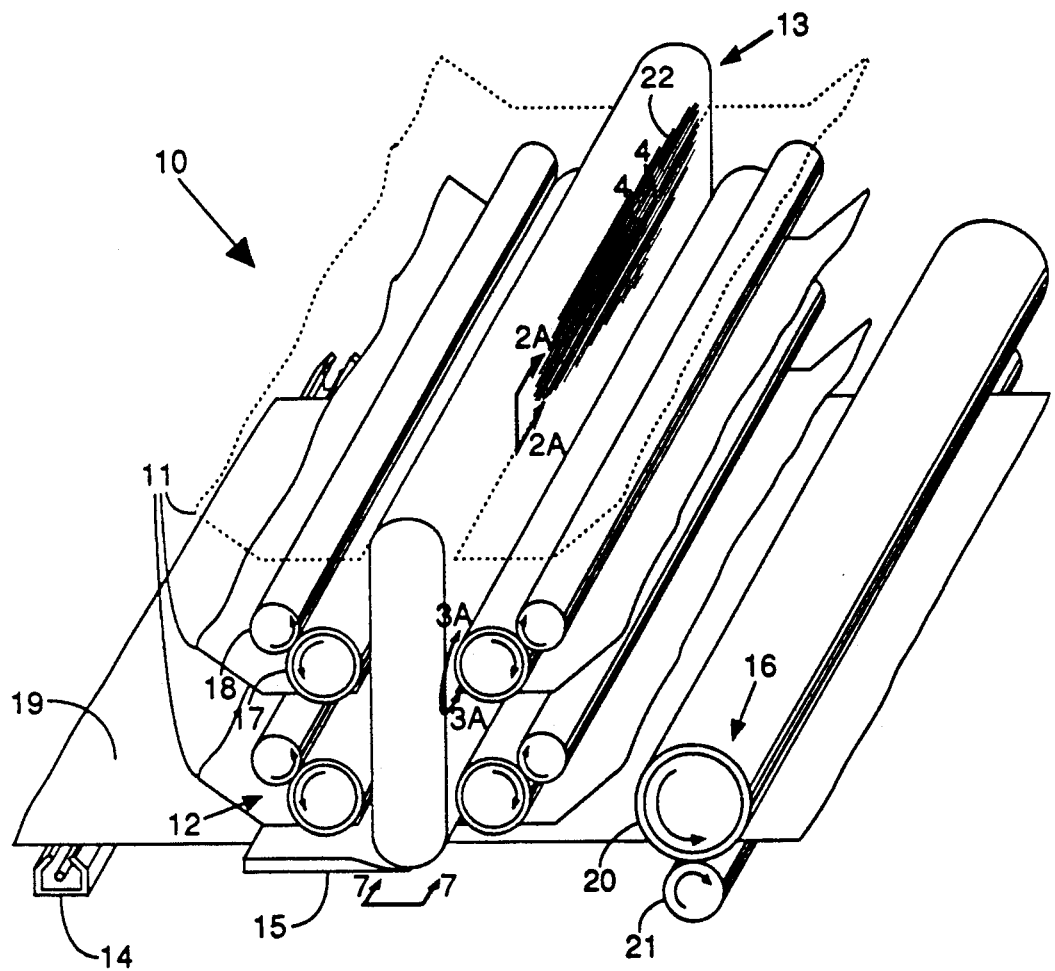
FIG. 1 is an oblique view of a four color print engine in accordance with the present invention.

FIG. 1 is an oblique view of an embodiment of a four color print engine 10 incorporating the invention. The printing apparatus 10 illustrated includes toner reservoir walls 11 that guide toner into four toner charging assemblies 12. The apparatus also includes a toner conveyor 13, corona charging device 14, writing head 15, and fuser 16. In the preferred embodiment the toner is a monocomponent non-magnetic insulating toner comprised of a resin binder, colorants, charge control additives, and surface additives as is known in the art. For each of the four colors, toner flows by gravity into its respective charging assembly 12. Each charging assembly 12 includes a donor roll 17 which is counter-rotating against a self-spaced roll 18 to triboelectrically charge the toner particles as is known in the art. The charged toner particles so produced have an average charge of the order of $10^{-14}$ coulombs. In the preferred embodiment the toner charge is positive. As will be described, toner conveyor electrodes can be electrically coupled to donor rolls 17 during toner loading, and decoupled at other times. Receiving sheet 19 moves past corona charging device 14, through an imaging area formed by writing head 15 and conveyor 13 where the toner is deposited in image configuration onto receiving sheet 19 as will be described, and finally passes through a fuser 16 where the toner image is fixed by application of heat and pressure. Fuser 16 includes heated fusing roller 20 and backup roller 21 as is known in the art. The width of writing head 15 covers the full page width in the preferred embodiment. As will be described, this provides high speed printing with a full line of pixels imaged simultaneously.

Figure 2A:
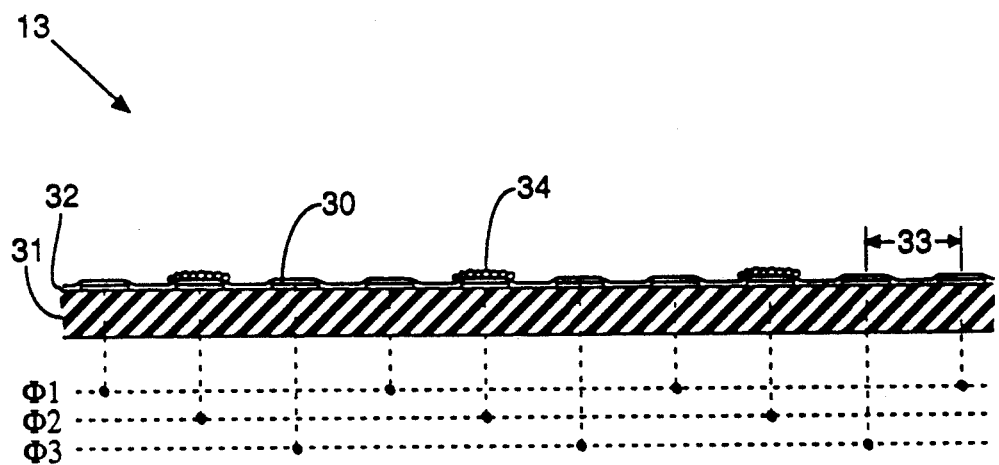
FIG. 2A is a fragmentary cross-sectional view of the portion 2A—2A of FIG. 1, showing three phases of a digital clock connected to elongated electrodes of the toner conveyor.

Stepping of toner particles from conveyor electrode to conveyor electrode under control of a stepping voltage is essential to the invention. The preferred embodiment employs a three phase digital toner conveyor clock as the stepping voltage means. Toner stepping of this type is further described in co-pending application Ser. No. 07/658,397. FIG. 2A shows a fragmentary cross-sectional view of toner conveyor 13 with elongated conveyor electrodes such as 30 fabricated on an insulating substrate 31. In the preferred embodiment, insulating substrate 31 is a flexible polyimide film with a thickness of approximately 50 microns. The electrodes are shown connected in order to three phases of toner conveyor clock $\Phi 1$, $\Phi 2$, and $\Phi 3$. The actual physical connections of the phase voltages to the electrodes occur at the sides of the flexible circuit, away from the imaging area, using a 2 layer thin film structure to connect the elongated conveyor electrodes to feed lines for each of the clock phases. The feed lines connect to driver circuits of a programmable three phase digital clock generator (not shown). A thin dielectric film 32 covers the electrodes in a smooth continuous manner. If film 32 were not provided, cracks, imperfections, and recesses at electrode edges might trap toner particles. Also, strong fringing fields at metal/dielectric interfaces might cause toner particles to stick if they were not covered. The elongated conveyor electrodes are closely spaced, with a pitch 33 of approximately 100 microns, so that a peak-to-peak clock amplitude of around 20 volts is effective in stepping the toner from one electrode to the next. It will be understood that the stepping voltage depends on the spacing of the electrodes; the closer is the spacing of the electrodes the less is the voltage required for stepping the toner from one electrode to the next. Every third electrode is coated with toner particles such as 34, and these electrodes are shown connected to $\Phi 2$.

Figure 2B:
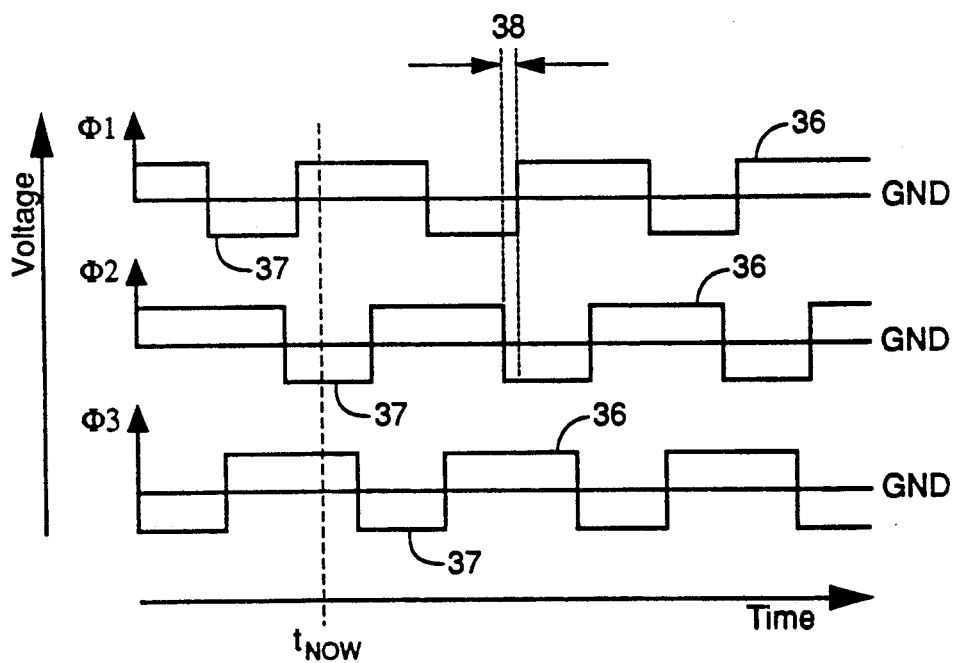
FIG. 2B shows voltage waveforms versus time for the three phase digital clock of FIG. 2A.

FIG. 2B presents plots of voltage versus time for the three clock phases. The instant in time corresponding to FIG. 2A is $t_{NOW}$ with $\Phi 2$ negative; $\Phi 1$ and $\Phi 3$ are positive. A negative voltage on an elongated conveyor electrode will attract the positively charged toner and a positive voltage will repel. Since $\Phi 2$ is the only negative phase at $t_{NOW}$, it is the only phase that attracts the toner particles. When positive voltage 36 is applied to neighboring electrodes, in this case $\Phi 1$ and $\Phi 3$ electrodes, negative voltage 37 is sufficient to jump the toner to the negative electrodes, connected to $\Phi 2$ in this case. It can be seen in the Figure that the negative voltage polarity advances from phase to phase over time, creating a travelling voltage wave that advances from electrode to electrode on the toner conveyor. The positively charged particles follow the travelling negative voltage wave, and stick only to every third electrode because only every third electrode is at the negative polarity.

Additionally in FIG. 2B, an overlap 38 of negative voltage is shown at each phase transition. This helps keep toner packets together during the stepping process. If there are no electrodes at the negative polarity, toner particle movements are dominated by interactions between the charged particles rather than by attraction to elongated electrodes. It has been observed that strong scattering of toner packets occurs whenever there is no negative electrode close by to bind the particles of the packet to the electrode, and this is significant even in the very brief time while the phases are switching polarities. This scattering of toner particles within a packet is caused by mutual repulsion between like charged toner particles. Overlap 38 has the desirable effect that stepping packets of toner particles are kept together during phase transitions. Toner particles within a packet are bound to a first electrode, then temporarily bound to both a first and a second electrode during the transition between phases, then bound to the second electrode by the stepping voltage.

The positively charged toner particles induce electrons in underlying metal electrodes, creating an image force. The image force between a charged particle and the underlying metal is an attractive force and varies inversely as the square of the distance between the positive and negative charges. Consequently, for toner particles whose radius approaches zero the image force can be large if the toner particle sits directly on the metal surface. Consequently, the smallest toner particles or "fines" will be the last to jump to the next electrode in response to a stepping voltage. Dielectric layer 32 serves to limit the image force, particularly for the smallest particles, by providing a minimum separation distance between the particle and the metal surface. The separation distance is equal to the thickness of the coating. The net result is that even the smallest toner particles will jump from one electrode to the next in response to the stepping voltage.

Figure 3A:
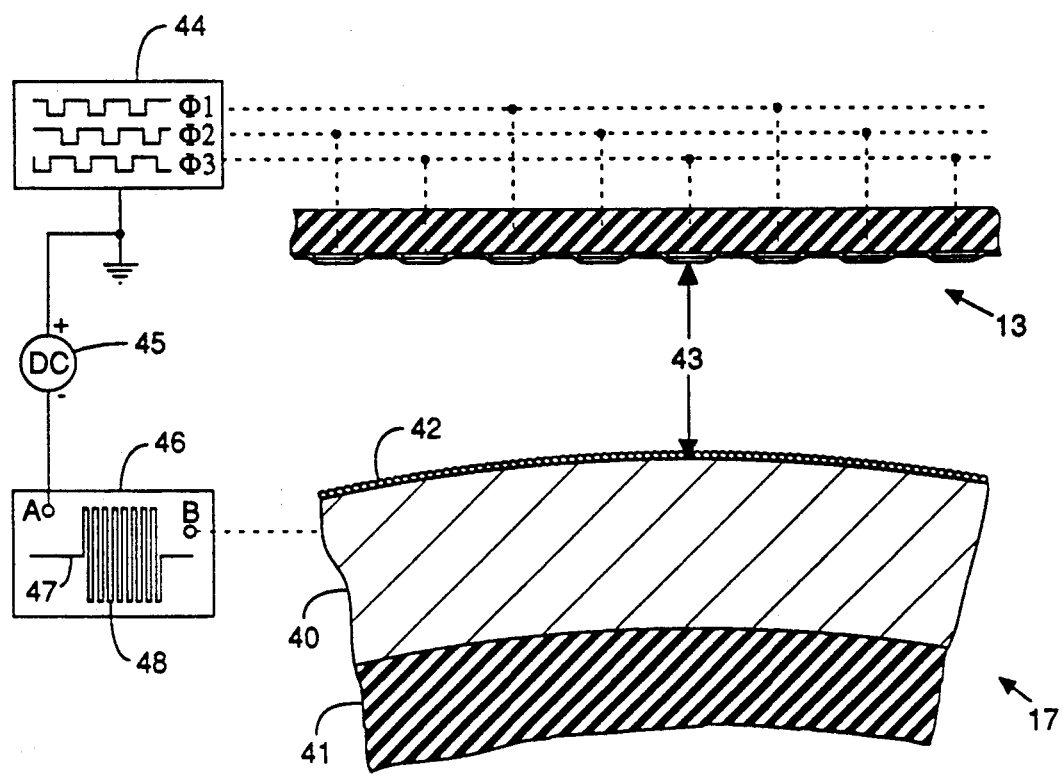
FIG. 3A is a cross-sectional view of the portion 3A—3A of FIG. 1 describing the loading assembly for the toner conveyor, before toner loading has occurred.

The operation of loading toner onto toner conveyor 13 will now be described, by referring to FIGS. 3A and 3B. In FIG. 3A a portion of toner conveyor 13 is shown in cross-section, as was described in reference to FIG. 2A. A cross-section of donor roll 17 near the outer circumference is shown, revealing a metal sleeve 40 attached to an insulating hub 41. Metal sleeve 40 has a monolayer of positively charged toner particles such as 42 on its surface and there is a minimum gap 43 between the outer surface of sleeve 40 and the surface of toner conveyor 13. A three phase digital clock generator 44 feeds $\Phi 1$, $\Phi 2$, and $\Phi 3$ to the toner conveyor. A dc source 45 is connected such as to apply a negative dc voltage to terminal A of programmable square wave generator 46. When square wave generator 46 is in its inactive mode, terminal A is connected directly to terminal B with no square wave superimposed on the dc voltage. In this case dc voltage 47, at the value output by dc source 45, is applied to sleeve 40 of donor roll 17. However, when square wave generator 46 is in its active mode, a square wave is superimposed on the dc voltage. In this case, voltage 48 is applied to sleeve 40. The effect of dc voltage 47 is to make the surface of donor roll 17 charge retentive. The effect of composite voltage 48, comprised of a dc component plus a square wave component, is to electrically couple the toner particles on the surface of the donor roll with the elongated electrodes of the toner conveyor. Thus the toner particles on the donor roll can be coupled to the conveyor electrodes by programming square wave generator 46 in its active mode. Conversely, the donor roll can be decoupled from the conveyor electrodes by programming square wave generator 46 in its inactive mode. As packets of loaded toner step around the toner conveyor, packets of one color will pass close by donor rolls of another color. To prevent undesirable cross mixing of colors, toner on the donor rolls must be isolated from the stepping voltages applied to conveyor electrodes at this time. It is the inactive mode of programmable square wave generator 46 that provides the required electrical isolation in this case.

FIG. 3A represents the situation before the first loading cycle occurs after the print engine is turned on. There is no toner on any of the toner conveyor electrodes, the outer surface of donor roll 17 has a full complement of toner, and there has been no coupling or interaction between the toner on the donor roll and the conveyor electrodes.

Figure 3B:
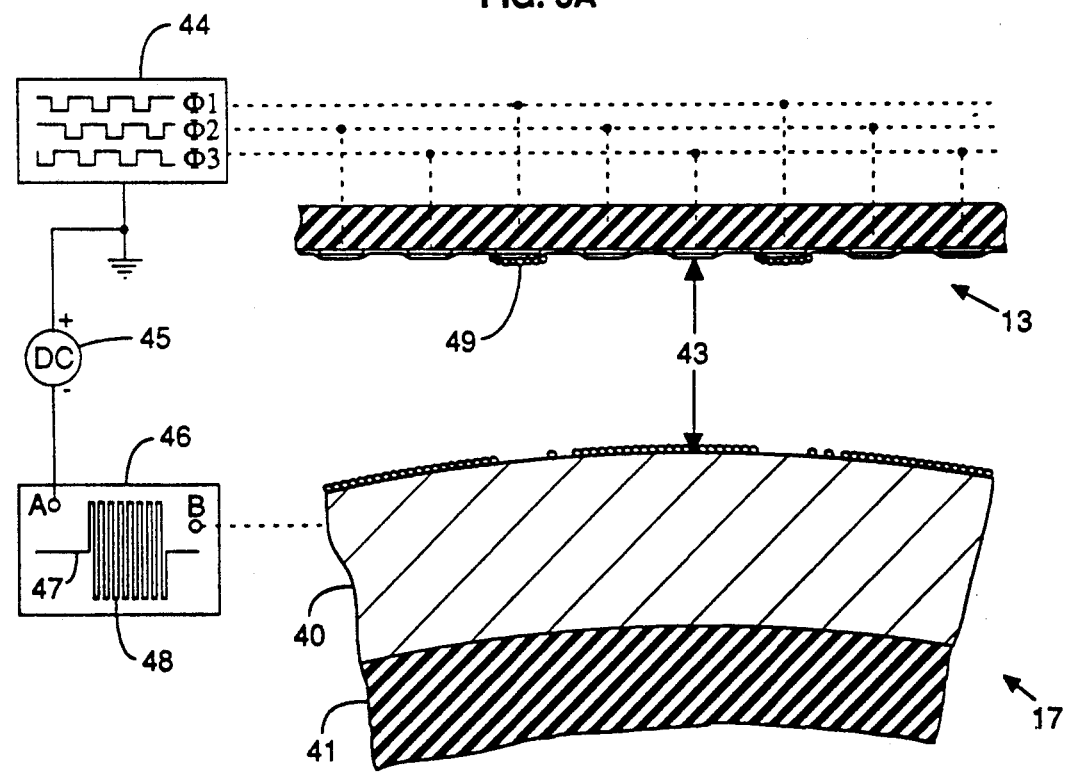
FIG. 3B is the same cross-sectional view as FIG. 3A, after toner loading has occurred.

FIG. 3B represents the situation after many cycles of voltage 48 have been applied to the donor roll, and then dc voltage 47 has been re-applied. The square wave component of voltage 48 causes toner particles to oscillate in the gap 43 between donor roll 17 and conveyor 13, striking each surface before returning to the other surface. The frequency of voltage 48 is preferably higher than the frequency of the conveyor clock. Then multiple opportunities exist for oscillating particles to transfer to conveyor electrodes as the stepping voltage conveys toner past the donor roll. Oscillating particles that strike a negative conveyor electrode are held on the conveyor electrode, but those striking a positive conveyor electrode are not held. FIG. 3B is drawn at the instant that $\Phi 1$ is negative. Consequently, the $\Phi 1$ electrodes attract and hold toner particles such as 49, but the other electrodes do not hold any toner. After an elongated electrode is fully covered with toner particles, the charge on the loaded toner particles provides an electrostatic screen that limits attraction of more particles. After loading in this manner, packets of toner can be stepped around the toner conveyor to be presented to the writing head. As will be described, a small number of the particles adhering to a loaded conveyor electrode can be pulled off during an imaging cycle by the writing action of a write electrode. In the following loading cycle, only the depleted toner particles on conveyor electrodes will be replaced.

Figure 4:
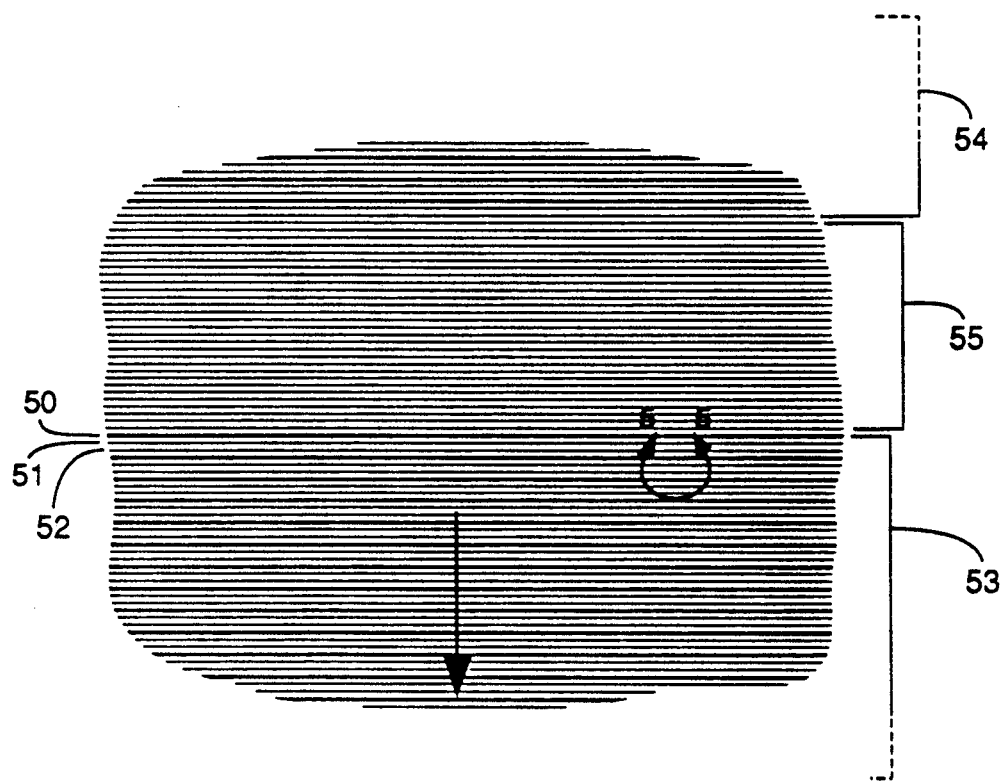
FIG. 4 is an enlarged fragmentary plan view of the portion 4—4 of FIG. 1.

FIG. 4 shows a fragmentary plan view of the portion 4—4 of toner conveyor 13 shown in FIG. 1. Three electrodes 50, 51, and 52 form a group, connected in order to three phases of a digital clock. Electrode 50 is darkened, indicating it has been loaded with toner. No toner is adhering to electrodes 51 and 52. By controlling the digital clock, toner patterns on the surface of the conveyor move in the direction of the arrow. It is convenient to load toner onto the conveyor in stripes of toner; for example toner stripe 53 has 63 groups of electrodes and has 63 electrodes loaded with toner of a particular color, say cyan. The next colored stripe 54 also has 63 groups of electrodes and 63 electrodes loaded with toner of a particular color, say yellow. Toner stripes 53 and 54 are separated by a blank space 55 with no loaded toner. In FIG. 2, blank space 35 consists of 10 groups of electrodes, and none of them are loaded with toner. Blank space 55 separates toner stripes of different colors to avoid cross contamination of colors.

Figure 5:
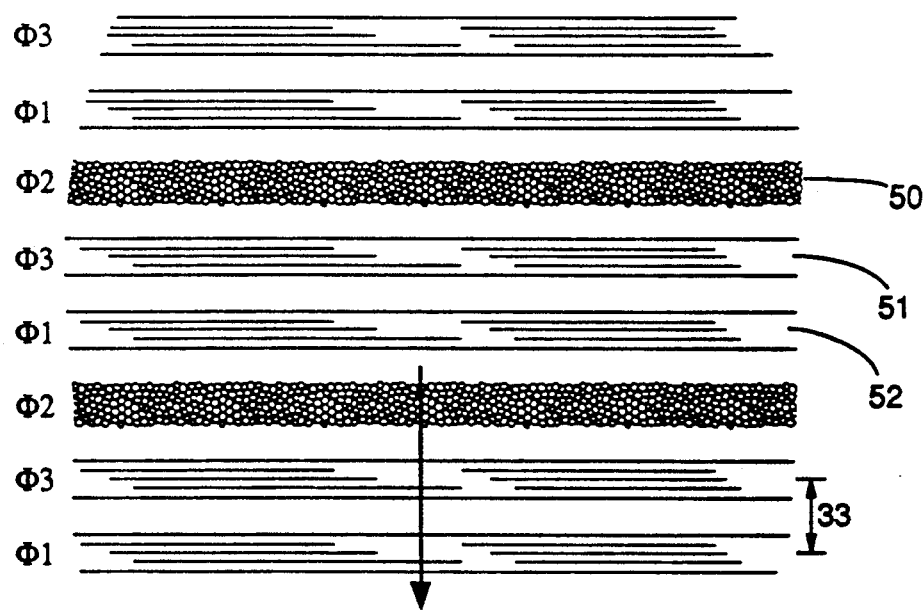
FIG. 5 is a further enlarged fragmentary plan view of the portion 5—5 of FIG. 4.

FIG. 5 is a further enlarged plan view of the portion 5—5 of FIG. 4. It shows electrode 50 loaded with toner, and electrodes 51 and 52 with no toner. Φ1, Φ2, and Φ3 are the three phases of the digital clock that controls toner movement on the conveyor. The loaded electrodes are connected to Φ2. The electrode pitch 33 is approximately 100 microns, as described in FIG. 2A. The length of the flexible circuit forming conveyor 13 is adjusted to provide continuity where the ends join, i.e. the linear array of electrodes repeats geometrically and electrically in a continuous loop. The precision required for cutting the flexible circuit to length can be achieved by plasma etching, as is known in the art.

Figure 6:
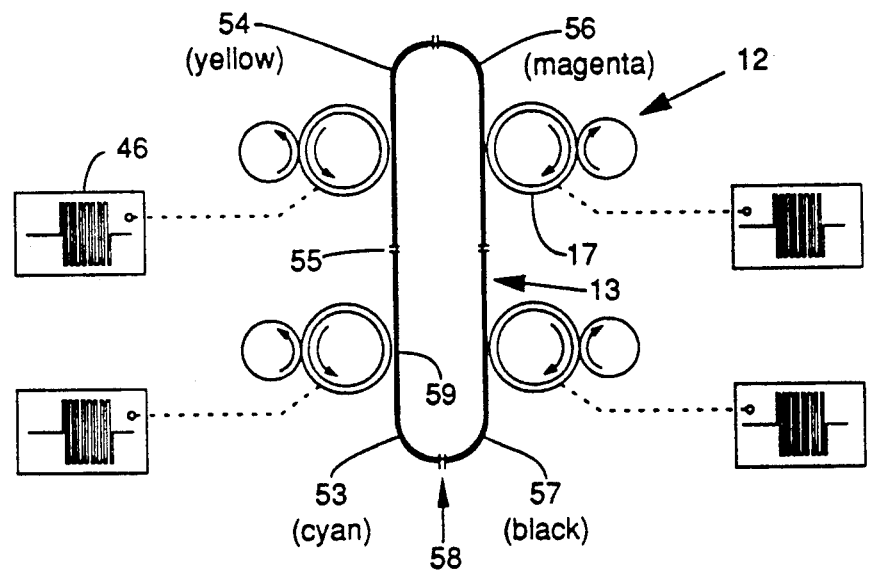
FIG. 6 is a schematic side view of the toner conveyor showing charging assemblies and loading voltage sources.

FIG. 6 shows a schematic view of toner conveyor 13 surrounded by four charging assemblies 12, with donor roll 17 of each charging assembly connected to a square wave generator 46. This Figure will be used to describe operations of the toner conveyor during a print cycle. A cyan stripe of toner 53 is separated by blank space 55 from yellow stripe 54. In addition toner stripes 56 (magena) and 57 (black) are shown, all separated by blank spaces such as 55. The conveyor clock steps the toner stripes around the conveyor with a counterclockwise rotatation. At imaging point 58, toners are presented in order, 63 loaded electrodes for each color, in the sequence cyan, yellow, magenta, black. This total sequence, comprising one complete electrical rotation of the conveyor, is performed every print cycle. Then the paper is stepped to the next pixel line and the next print cycle is performed. Loading points such as 59 are defined at the minimum gap between each donor roll 17 and conveyor 13. The loading points are spaced sufficiently far from imaging point 58 that loading and imaging can be treated as independent processes, and can occur simultaneously. The printer controller puts each square wave generator into active mode as its corresponding color stripe steps by, and into inactive mode at all other times. Thus the necessary coupling and decoupling of conveyor electrodes to toner on the donor rolls is achieved. Because toner loading is performed "on-the-fly", maximum printing speed can be achieved.

Figure 7:
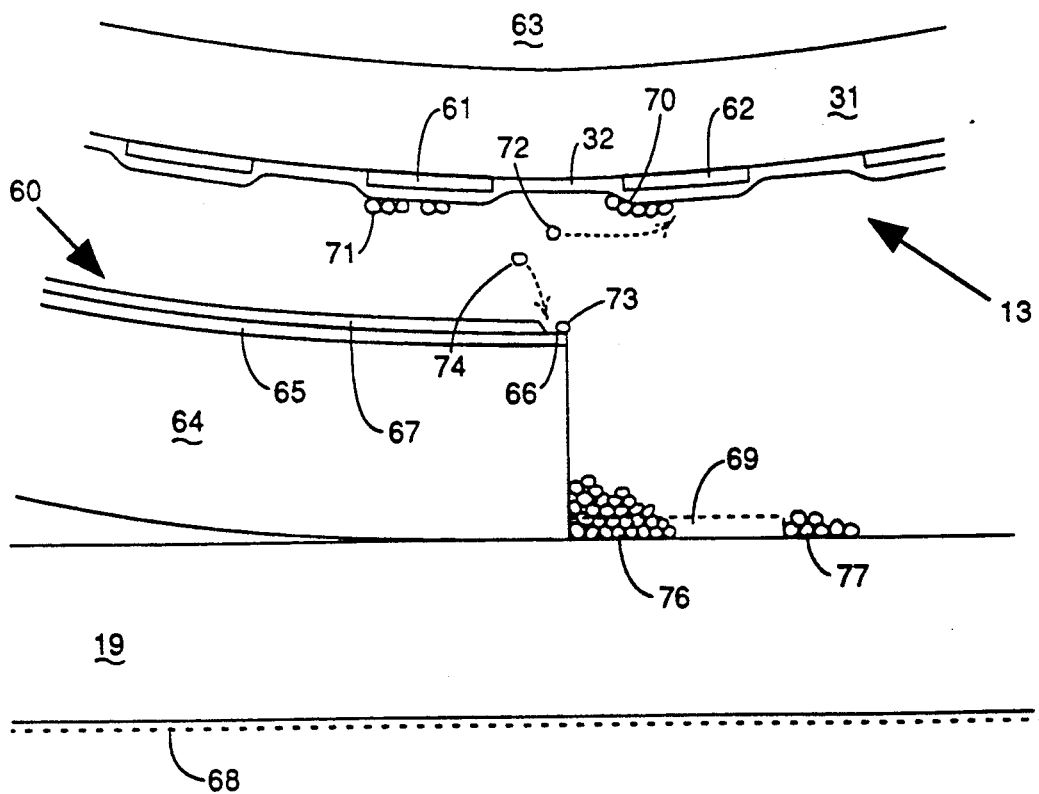
FIG. 7 is an enlarged cross-sectional view of the portion 7—7 of FIG. 1.

FIG. 7 is an expanded cross-sectional view of the writing head region of the print engine taken generally along the line 7—7 of FIG. 1 and will be used to describe an imaging cycle. Toner conveyor 13 includes elongated electrodes such as 61 and 62 connected to Φ1 and Φ2 respectively. Electrodes 61 and 62 are fabricated on flexible substrate 31 which is bonded on a supporting member 63. Conveyor electrodes are covered with a thin dielectric coating 32 as previously described.

Writing head 15 includes a supporting member (not shown) with flexible circuit 60 attached except for the writing end which extends unsupported. Flexible circuit 60 is fabricated on a polyimide substrate 64 and the unsupported end rides on receiving sheet 19 as shown. Opposing the conveyor on the top surface of flexible circuit 60 are feed lines 65 terminating in write electrodes 66 which will be further described in FIG. 8. Feed lines such as 65 are driven from integrated circuits mounted on writing head 15 as will be further described in FIGS. 10 through 13. Feed line 65 is covered by insulating overcoat 67, except for a small exposed region that defines write electrode 66. The riding of flexible substrate 64 on receiving sheet 19 provides simplicity of the mechanical design; it assures that a constant distance is maintained between the write electrodes and the top surface of the receiving sheet, desirable for uniform transfer characteristics. The back side of receiving sheet 19 is uniformly coated with negative charge 68 produced by corona charging device 14 (FIG. 1) using methods known in the art; the purpose of the negative charge is to assist transfer of particles released from write electrodes such as 66 to pixel sites such as 69 on receiving sheet 19, as will be further described. FIG. 7 is a snapshot of the instant that toner is jumping between electrodes 61 and 62 on the toner conveyor. Electrode 61 is connected to Φ1 and electrode 62 is connected to Φ2, in accordance with the voltage waveforms depicted in FIG. 9. Some toner particles such as 70 have already jumped to electrode 62. Others such as 71 are still held by electrode 61. Particle 72 is in transit from electrode 61 to electrode 62. Particle 73 has already been diverted to write electrode 66 and particle 74 is in transit to electrode 66. Write electrode 66 is positioned close to the imaging point defined by electrodes 61 and 62 so that voltage pulses of the order of 20 volts peak to peak will be sufficient to attract toner particles like particle 74 to the write electrodes. FIG. 9 will show the synchronization required between conveyor clock pulses and write pulses; synchronization is readily achieved with a digital control system as in the preferred embodiment. After the write electrode has pulsed negative and captured a programmed write packet, its polarity is reversed so as to repel the particles. The repelled particles are then attracted by the field associated with transfer charge 68 and transferred to pixel sites such as 69 on the receiving sheet. At the instant when write electrodes such as 66 release their packets, conveyor electrodes 61 and 62 are repelling, as further described in relation to FIG. 9, allowing the transfer charge to dominate the behavior of the released toner particles. Each write pulse delivered to a write electrode will result in transfer of a write packet to the receiving sheet. Accumulation of particles such as 76 continues at pixel site 69 until all four colors have been imaged, to the toner depth required for each color. The color process is subtractive and the toner particles are translucent, so that the superposition of colored toners can produce the full spectrum of desired colors. After the print cycle is complete, the receiving sheet is stepped by one pixel position, ready to image the next pixel line. Stepping of the receiving sheet is performed by a stepper motor (not shown) in response to control voltages generated on a controller board (not shown). A pile of toner particles such as 77 is shown at the adjacent pixel site, representing the accumulation of toners produced at that site during the previous print cycle.

Figure 8:
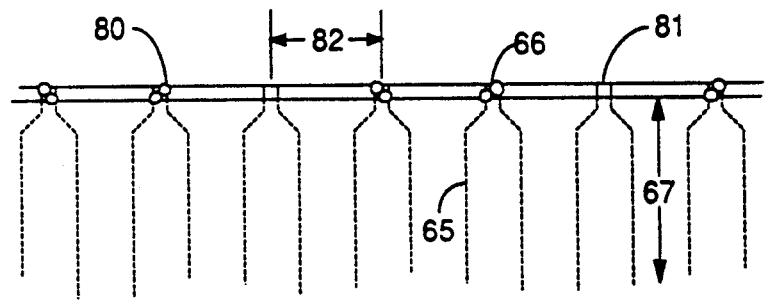
FIG. 8 is a magnified fragmentary plan view of write electrodes on the writing head.
Figure 9:
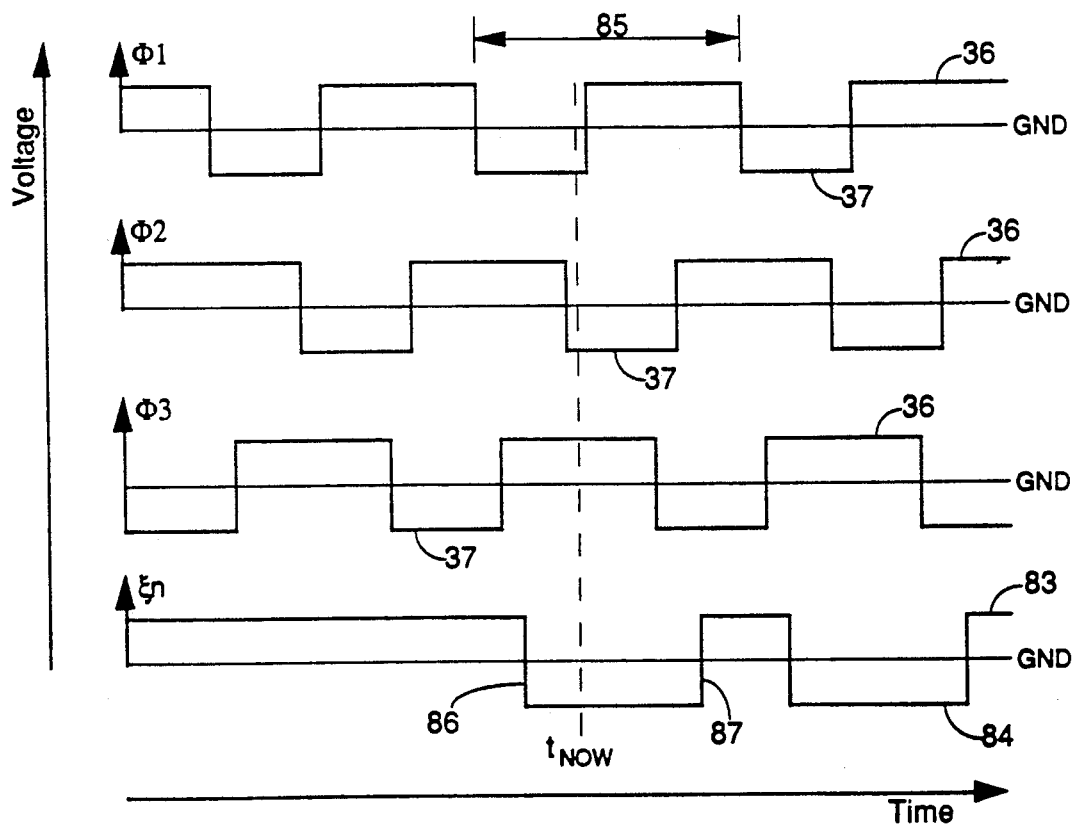
FIG. 9 shows the synchronization of image writing pulses with the three phases of the conveyor clock.

FIG. 8 is a fragmentary expanded plan view of write electrodes on the writing head and shows feed line 65 terminating in write electrode 66. Write electrodes 66 are made small to attract only a small number of toner particles per voltage pulse applied. Insulating overcoat 67 extends up to the write electrodes as shown. If a negative write pulse is applied, toner particles such as 80 will be attracted to the write electrode. On the other hand, if the write electrode is held positive and no write pulse is applied, no toner particles will be attracted to the corresponding write electrode, e.g. write electrode 81. The pitch of the write electrodes 82 is 85 microns in the preferred embodiment, providing a print resolution of 300 pixels per inch across the page. A paper stepping increment of 85 microns provides the same print resolution in the orthogonal direction. The writing head extends approximately eight inches in the longitudinal direction to cover the width of a standard sheet of paper, as shown in FIG. 1. It is of course understood that wider or narrower print widths and conveyors may be used. All of the write electrodes requiring toner pulse simultaneously, leading to high printing speeds.

In the preferred embodiment, one 64th of the toner required to saturate a pixel in a particular color is the ideal amount of toner in a write packet attracted to a write electrode per write pulse applied. Then 64 toner depth levels per color, corresponding to 24 bit color, can be achieved by counting the appropriate number of write pulses applied to the write electrodes. If no toner is required then zero write pulses will be applied to the write electrode. On the other hand, to saturate the pixel site in question, 63 write pulses will be applied. Applying from 0 to 63 write pulses provides a total of 64 toner depth levels at each pixel site. In the preferred embodiment, the mean toner diameter is eight microns. Pixel site 69 has an area of 7168 square microns, requiring approximately 112 particles to cover it with a single layer of toner particles. To saturate a pixel site with a given color, 128 particles of that color are required in the preferred embodiment. To obtain 64 toner depth levels per color, a packet size of two average toner particles per write pulse are required, and write electrode 66 is sized to accommodate this amount of toner in a single layer. Providing 64 toner depth levels for each of four colors provides 24 bit color. Thus 16.7 million color combinations are independently programmable at every pixel site, i.e. at the full print engine resolution.

FIG. 9 shows voltage waveforms as a function of time for the three phases of the conveyor clock, $\Phi 1$, $\Phi 2$, and $\Phi 3$ and for one of the write electrodes, $\xi n$. Positive voltage 36 is the voltage required to prevent toner particles from adhering to an electrode and to release the particles to jump to a neighboring electrode, as previously described. Negative voltage 37 represents the value required to cause all the particles to jump to the next electrode, when the neighboring electrodes are at positive voltage 36. A different set of positive voltage 83 and negative voltage 84 are required for toner release and attraction at the write electrodes, optimized for the small write packets desired to implement an imaging cycle, described in reference to FIGS. 7 and 8. Cycle time 85 is the time required to transfer a single packet of toner from a toner conveyor electrode to each of the pixel sites that require it. "$t_{NOW}$" is the instant in time that toner particles are jumping between electrodes, as discussed relative to FIG. 7. Note that $\xi n$ pulses in synchronism with the conveyor clock, with leading edge 86 preceding $\Phi 2$ active, and trailing edge 87 succeeding $\Phi 2$ inactive. It can be seen at the instant 87 when $\xi n$ pulses positive on write electrode 66 to repel a packet of toner, the opposing electrodes 61 and 62 on the toner conveyor are both positive corresponding to the $\Phi 1$ and $\Phi 2$ waveforms applied. This means that toner particles released from the write electrode are repelled by the nearby toner conveyor electrodes. Therefore, only a weak field emanating from the transfer charge 68 will be sufficient to capture the released toner particles on the receiving sheet.

A stepping motor is employed in the preferred embodiment to advance the paper by one pixel line after each print cycle. This implementation has the advantage that printing of a page can be stopped after any pixel line with no discontinuity in the overall image caused by starting and stopping. Thus high print quality can be achieved even with low input data rates from the information source. Further, this can be achieved with a print engine data buffer of only one pixel line of data rather than a full page of image data. However, for high speed printing machines it is advantageous to buffer a complete page of image data which is then printed without stopping. For this case, paper feeding is continuous rather than stepped, with no delays imposed between print cycles for paper stepping.

A CMOS output driver circuit can switch 20 volt levels in a few tens of nanoseconds when capacitively loaded as in the preferred embodiment. Referring to FIG. 9, a cycle time 85 of 1 microsecond for performing one imaging cycle is achievable. With this cycle time, for 64 toner depth levels, a pixel line can be imaged and transferred to the print substrate every 292 microseconds in the preferred embodiment. This calculation allows 63 microseconds to process each toner stripe, 10 microseconds for the blank space between toner stripes, and four toner stripes per print cycle corresponding to one complete electrical rotation of the toner conveyor in 292 microseconds. It is assumed that a freshly loaded conveyor electrode is provided for each imaging cycle, with one write pulse per imaging cycle. Assuming continuous paper feed, 300 pixels per inch print resolution, and a 10 inch print length, the print time per page is 876 milliseconds. Thus, printing speeds of up to 60 pages per minute are feasible with the present invention, while providing 24 bit color at every pixel site.

The preferred shape of the programmed pulses is square, as shown in FIGS. 2B and 9. U.S. Pat. No. 4,653,426 issued to Kohyama, teaches that a group of sinusoidal frequencies more effectively jumps toner across a gap than a single frequency. For a given peak voltage, a square wave pulse will be even more effective in jumping toner across a gap because a square wave contains a large range of frequency components. Kohyama applied several frequencies in a time sequence. Square waves effectively apply a greater number of frequencies simultaneously, owing to the large number of harmonics inherently present within a square wave. In addition, square waves are easily generated by digital circuits, as in the preferred embodiment, and the fact that different pulse sequences can be readily programmed in a digital system is key to cost effective implementations.

Figure 10:
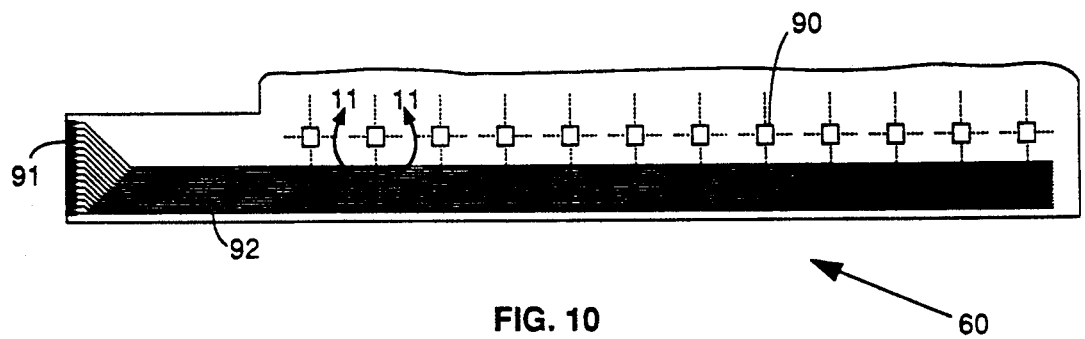
FIG. 10 is a fragmentary plan view of the data input end of a flex circuit mounted on the top surface of the writing head, showing integrated circuits for processing the input data into toner controlling pulses.

Referring to FIG. 7 it has been described that integrated circuits (ICs) drive feed lines 65 connecting to write electrodes such as 66. The functions and physical implementations of the ICs will now be described. FIG. 10 shows a fragmentary view of flexible circuit 60 at the data loading end. Flex circuit 60 includes two conductive layers, edge connector pads 91, and conducting traces 92 for providing power, data, and control signals to multiple identical large scale integrated circuits (ICs) 90 which are mounted on the flex circuit. Additionally, one control line is output from each IC and input to the next for addressing purposes. Preferably the ICs are mounted using flip chip bonding to minimize the cost of input/output connections to the ICs. ICs 90 convert image descriptions from an information source into programmed write pulses. The information source provides 6 bits of intensity data for each of the four colors in a data word of 24 bits per pixel in the preferred embodiment. The print engine controller provides an input clock to ICs 90 such that they operate in synchronism with the three phase conveyor clock, and with the square wave generator 46 for toner loading.

Figure 11:
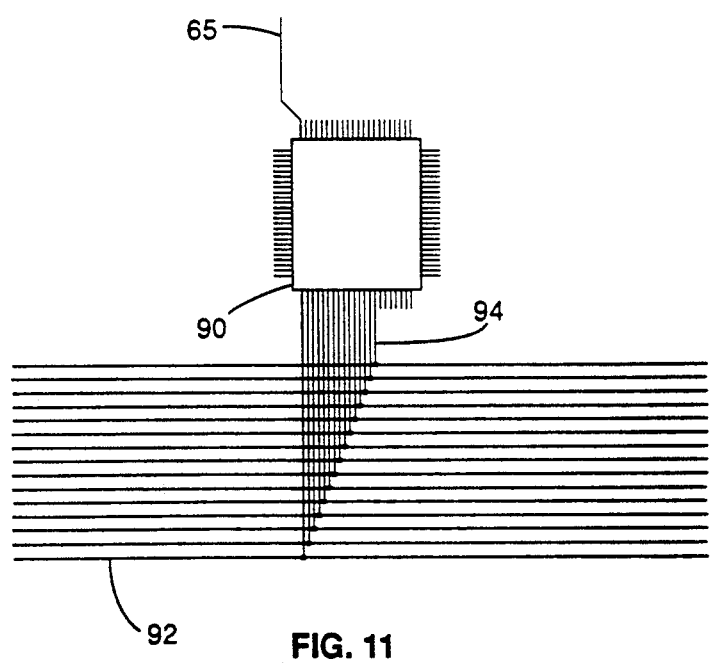
FIG. 11 is a detailed plan view of the portion 11—11 of FIG. 10 showing details of input and output connections to an integrated circuit of FIG. 10.

FIG. 11 shows the portion 11—11 of FIG. 10 which is an expanded plan view of IC 90 plus surrounding connecting traces. Conductive traces 92 of FIG. 10 connect to input traces 94 of IC 90. IC 90 contains the logic, memory, and driver circuits necessary for converting high level image descriptions into digital pulse trains for driving the write electrodes, as will be further described in reference to FIG. 12. Conductor 65 is the feed line connecting to write electrode 66.

Figure 12:
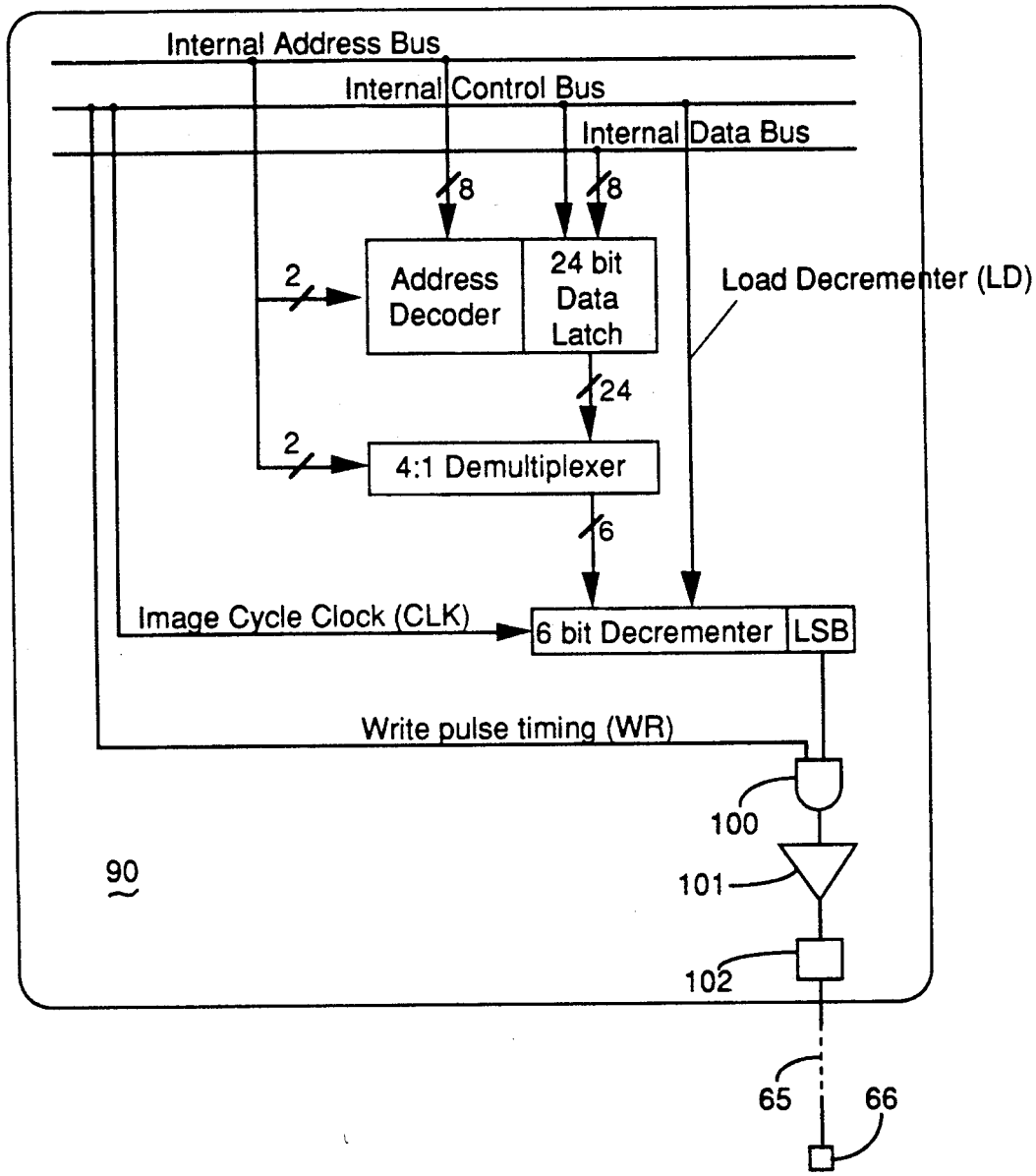
FIG. 12 is a functional block diagram of the logic circuits associated with an output driver on the integrated circuit of FIG. 11.

FIG. 12 is a functional block diagram of the circuits associated with a single output driver on IC 90. Internal address, control, and data buses route address, control, and data information to all of the output driver circuits. In the preferred embodiment, IC 90 has 256 output drivers, and the address of each driver is decoded from an 8 bit address word in the address decoder. When a particular driver is selected by the address decoder, a 24 bit data word can be written in three consecutive bytes to the 24 bit data latch using two additional address bits to point to each of the three bytes within the 24 bit word. Processing of a particular color requires only a 6 bit portion of the 24 bit data word, selected by the demultiplexer using the same two additional address bits to select the current color. A load decrementer control signal loads in parallel the output of the demultiplexer into the 6 bit decrementer. The value loaded is the number of write pulses requires for the current color at the selected pixel site. The control bus provides an image cycle clock as each image cycle is preformed, and an edge of the image cycle clock decrements the value in the 6 bit decrementer. As long as the least significant bit (LSB) of the 6 bit decrementer is non-zero, write pulses will be produced at the output of AND gate 100 during each imaging cycle, using write pulse timing provided by the control bus. The output of AND gate 100 passes through low impedance driver 101 to provide adequate current to drive the load capacitance associated with output pad 102, feed line 65, and write electrode 66, at the desired switching speeds of FIG. 9. Driver 101 also includes level shifting circuits to convert from a logic level of 5 volts at the input, to a drive level of 20 volts at the output, in the preferred embodiment.

Figure 13:
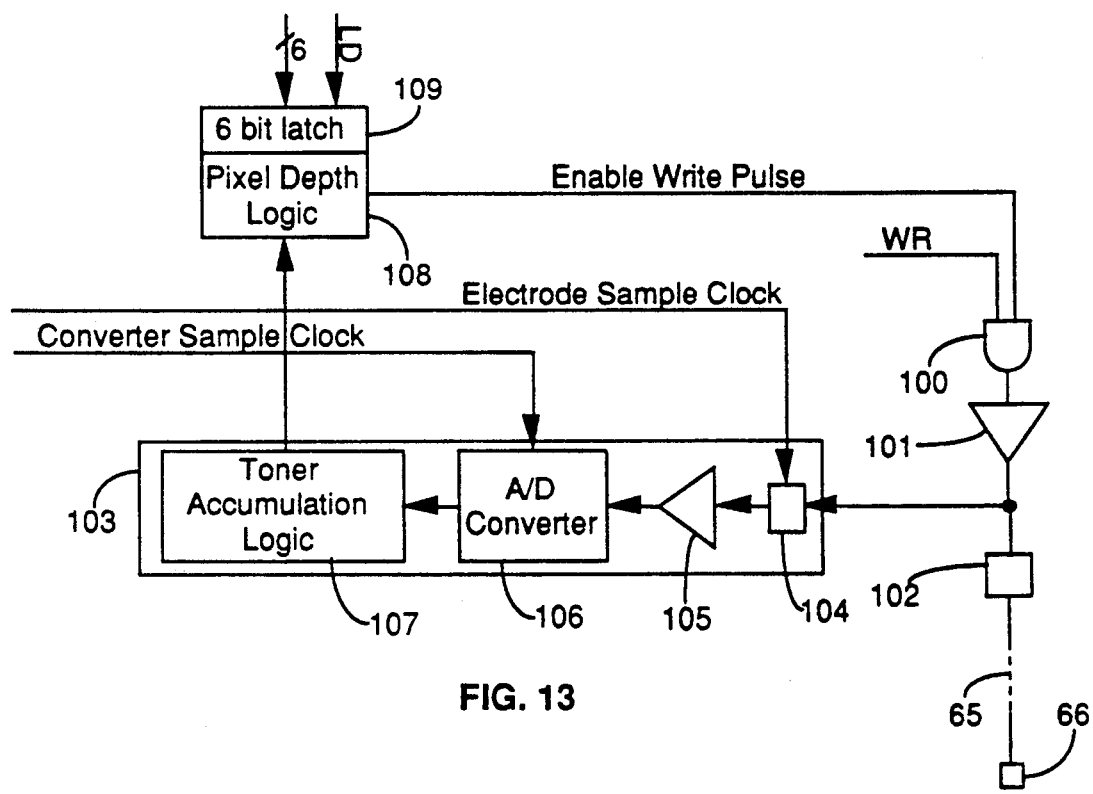
FIG. 13 is an expansion of the functional block diagram of FIG. 12 showing the addition of closed loop control to the output driver circuit.

FIG. 13 shows an enhancement to the driver circuit of FIG. 12. While the open loop control system of FIG. 12 has the advantage of simplicity, the closed loop control system in FIG. 13 is capable of more accurate colors by using feedback to sense the amount of toner actually delivered to a write electrode during an imaging cycle. Feedback is performed using particle detection and measuring circuits 103. A transfer gate 104 controlled by an electrode sampling clock samples write electrode 66 via bonding pad 102 and feed line 65. The sampled electrode voltage is amplified in a sense amplifier 105 whose output is sampled by a converter sampling clock and input to A/D converter 106. The digital word describing the instantaneous potential of write electrode 66 is input to a logic block 107 that computes the total amount of toner received of the current color. This information is fed to pixel depth logic 108 which decides whether or not to enable further write pulses based on the measured total accumulation of toner at the write electrode. For this method to be accurate it is required that all toner arriving at the write electrode is transferred to the corresponding pixel site, and that toner particle charge is a good indicator of toner mass and consequently of toner colorant. The 6 bit data word is loaded into a 6 bit latch 109 rather than the decrementer of FIG. 12, and pixel depth logic 108 compares total accumulated toner against the amount programmed in the 6 bit latch 109. This method can be used to subdivide a programmed toner packet into individual particles for more accurate metering of toner to the selected pixel site. It can also adapt to different sizes of toner particles delivered to the write electrodes.

Figure 14:
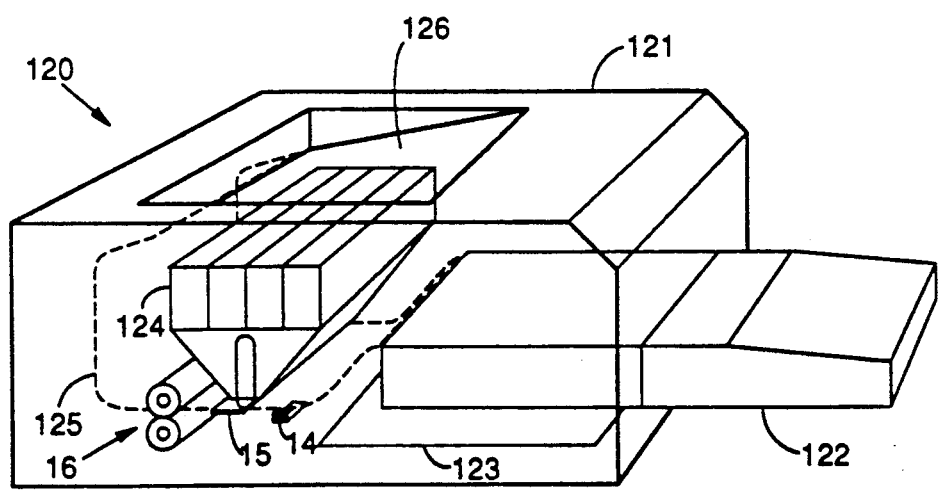
FIG. 14 is a perspective schematic drawing of a desktop printer embodying the present invention.

FIG. 14 is a perspective schematic drawing of a desktop printer 120 embodying the current invention. Enclosure 121, paper tray 122, controller board 123, and toner cartridges 124 are shown. The simple paper path 125 shows the receiving sheet passing by corona charging device 14, writing head 15, and fuser 16, before ejecting into the paper tray 126.

Color accuracy can also be improved using calibration methods. One such calibration technique particularly suitable for the open loop control system of FIG. 12 involves testing the differences between write channels which may occur due to manufacturing tolerances on the output drivers, and differences in capacitive loading from one write electrode to another. These and other differences can be measured during testing of the print engine, using a scanning device to measure the printed image and comparing that with the programmed image, for each pixel site. Then calibration factors can be calculated and written to a calibration look-up table maintained by the print engine controller. During printer warmup, the calibration factors can be retrieved from the calibration look-up tables and written to a calibration memory provided in the integrated circuits on the writing head. Thus the number, duration, or amplitude of voltage pulses applied to each write electrode can be adjusted by the appropriate calibration factor.

It should be apparent by the teaching of the invention that digital algorithms have broad applicability to color marking engines. A preferred embodiment has been described for a single pass color printing engine employing a single toner conveyor. Clearly, a similar process could be employed using multiple conveyors, one for each color, and this would avoid some difficult process issues relating to cross contamination of the colors; however it would be more costly to manufacture. Also monochrome versions of the printer can easily be provided by removing three of the four toner sources, and changing the software that implements the imaging algorithm. Many other embodiments will be apparent to practitioners skilled in the art.

Figure 15:
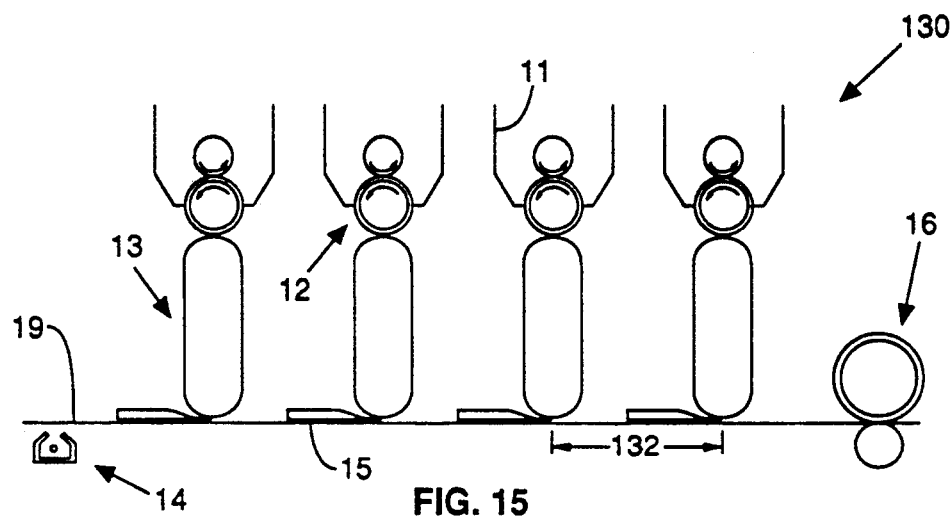
FIG. 15 shows a side schematic view of an alternative color printing embodiment employing one set of charging assembly, toner conveyor, and writing head for each toner color.

FIG. 15 shows an alternative embodiment 130 of the color print engine. The illustration shows walls of toner reservoirs 11 guiding toner into charging asemblies 12. The illustration also shows four toner conveyors 13 and writing heads 15. The distance between imaging points 132 is a multiple of the pixel length to allow correct registration of the four colors, and the print algorithm is adjusted to apply the four colors sequentially, with a set number of paper steps between imaging points.

Figure 16:
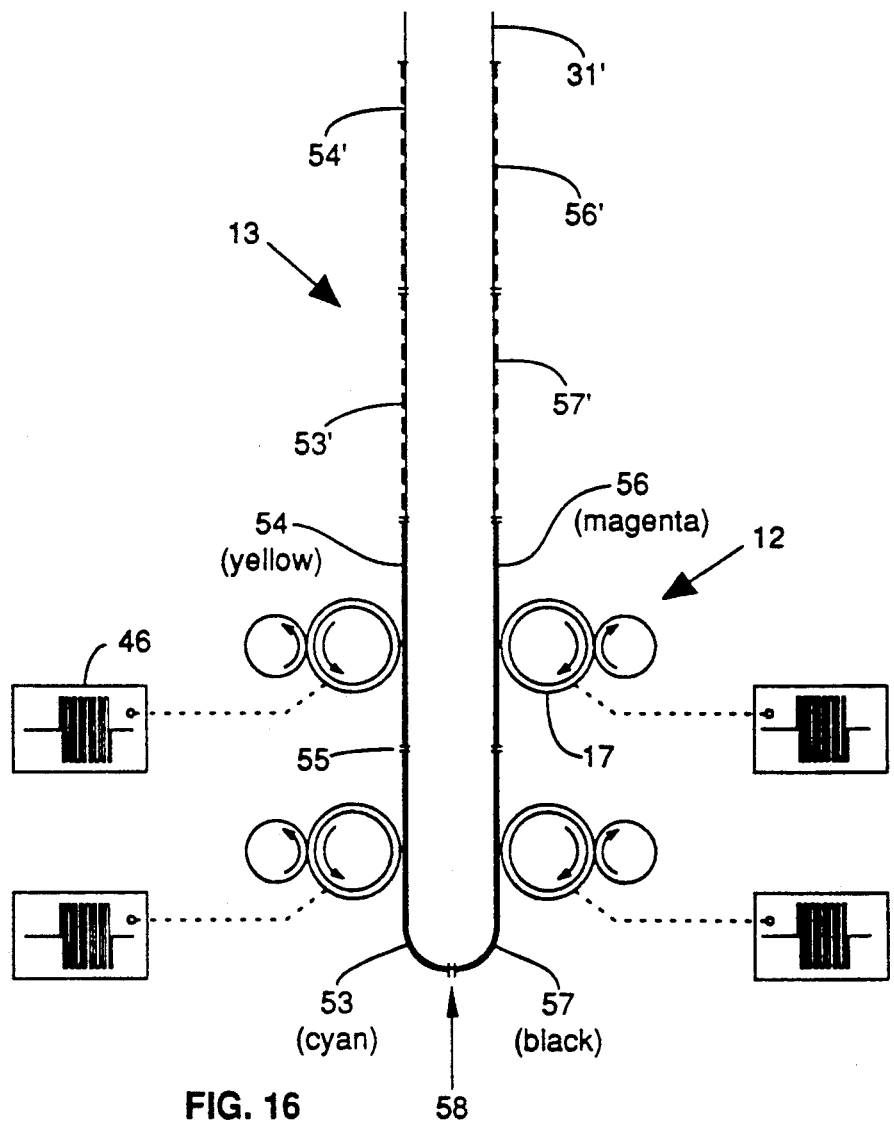
FIG. 16 shows a side schematic view of an alternative embodiment of the toner conveyor formed in a "U" shape rather than in a continuous loop.

FIG. 16 shows an alternative embodiment of toner conveyor 13 that avoids manufacturing difficulties associated with forming flexible circuit 60 into a continuous loop. Toner stripes 53, 54, 56, and 57 are shown as in FIG. 6. However, rather than performing a print cycle by a continuous electrical rotation of the toner stripes, a "rocking algorithm" is programmed. The final imaging cycles for yellow toner are preformed with magenta and black toner stripes backed up into positions 56′ and 57′ respectively. Then the stepping direction is reversed until the final imaging cycles for magenta are performed with yellow and cyan toner stripes backed up into positions 54′ and 53′ respectively. As with the continuous loop conveyor, toner loading can be performed "on-the-fly".

What is claimed is:

1. A color printing apparatus for printing on an image receiving member comprising:
   a plurality of toner particle sources each of a different color;
   a particle conveyor means that conveys toner particles from loading points adjacent said toner particle sources to an imaging point, in response to control voltages;
   a toner loading means associated with each toner particle source for loading lines of toner from said toner particle sources to loading points on said particle conveyor means;
   means for controlling said toner loading means to couple and decouple said toner sources to the particle conveyor means to selectively load lines of toner to the loading points on said particle conveyor means;
   an image writing member positioned opposite side imaging point with means to attract particles in discrete packets from said lines of toner on said particle conveyor means, and then release them in response to control voltages;
   an image receiving member adjacent said image writing member;
   means to transfer said released particles from the image writing member to corresponding pixel sites on said image receiving member; and
   means for applying control voltages to said particle conveyor means and said image writing member to deliver a predetermined amount of toner of each color to each of said corresponding pixel sites on the image receiving member.

2. A printing apparatus as in claim 1 in which said particle conveyor means extends across said image receiving member and includes a plurality of spaced stepping electrodes extending across said conveyor means, and said image writing member extends across said image receiving member.

3. A printing apparatus as in claim 2 in which said means to couple and decouple said toner sources to said particle conveyor means includes the application of control voltages between the toner particle source and stepping electrodes of the particle conveyor means.

4. A printing apparatus as in claim 2 in which said electrodes are covered with a thin dielectric film.

5. A printing apparatus as in claim 1 in which said particle conveyor comprises a substrate with an array of spaced electrodes, in which said means for applying control voltages to said conveyor means comprises drive lines connected in repeating sequence to the spaced electrodes, and said voltages are applied in phase order to said drive lines to cause toner particles to jump from electrode to electrode under the control of a print engine controller.

6. A printing apparatus as in claim 5 wherein said means for applying voltages in phase order to the particle conveyor electrodes comprises a programmable multiphase digital clock, programmed to advance toner particles in accordance with toner loading cycles and toner imaging cycles.

7. A printing apparatus as in claim 1 in which said image writing member includes one electrode for each of said corresponding pixel sites on the image receiving member, and in which said means for applying control voltages includes at least one integrated circuit with an output driver connected to each write electrode.

8. A printing apparatus as in claim 7 in which said integrated circuits convert high level image data from an information source into image writing voltage pulses delivered via said output drivers.

9. A printing apparatus as in claim 8 wherein said integrated circuits include counting means to define the number of pulses applied at each write electrode, thereby defining the number of packets of toner delivered to each pixel site on said image receiving member.

10. A printing apparatus as in claims 1 or 7 in which the image receiving member and the image writing member are moved relative to one another to accomplish printing of a two dimensional image.

11. A printing apparatus as in claim 10 wherein said image receiving member and said image writing member are moved relative to one another in periodic steps, whereby a controlled number of packets of toner can be delivered to each pixel site on the image receiving member between each of said steps.

12. A color printing apparatus for forming toner images on an image receiving member, said apparatus including:
    at least two sources of charged toner particles of different colors;
    a single particle conveyor comprising a linear array of spaced electrodes with control lines connected in repeating sequence to said electrodes;
    means to couple said toner particle sources to said spaced electrodes for the purpose of loading toner onto said particle conveyor;
    electronic means to move toner particles from electrode to electrode on said particle conveyor, to an imaging point;
    a writing head including write electrodes interposed between said imaging point and said image receiving member with means to attract predetermined amounts of toner from said conveyor to said write electrodes;
    means to transfer said predetermined amounts of toner from said write electrodes to corresponding pixel sites on said image receiving member; and
    means for moving said image receiving member relative to said write electrodes.

13. A printing apparatus as in claim 12 wherein said means to attract packets of toner at write electrodes.

14. A printing apparatus as in claim 12 wherein said electronic means includes a programmable multiphase digital clock generator whose output is connected in phase order to said control lines of said particle conveyor, to move charged particles along said conveyor in a digitally controlled manner past said imaging point.

15. A printing apparatus as in claim 12 and including calibration means to reduce the effect of differences between write channels, thereby to meter precise amounts of toner at the write electrodes, in accordance with the programmed demand for toner at the corresponding pixel site.

16. A printing apparatus as in claim 1 to 12, and including means to fix said toner particles after transfer to said receiving member to produce a permanent image on said receiving member.

17. The method of printing with toners of different colors on a substrate comprising the steps of:
   conveying toner from a toner source for each color to an imaging point;
   interposing a writing head between said imaging point and said substrate;
   attracting toner from said imaging point to said writing head during an image cycle;
   transferring toner from said writing head to corresponding pixel sites on said substrate; and
   controlling the amount of toner attracted to said writing head during an image cycle to control the toner depth at said pixel sites.

18. The method as in claim 17 including the step of providing relative movement between the substrate and the writing head to print a two-dimensional image.

19. The method of printing as in claim 17 in which toner is independently delivered to a plurality of in-line write electrodes and said substrate is moved perpendicular to said line whereby to simultaneously print a line of pixel sites on said substrate.

20. The method of printing as in claim 17 in which toner is attracted to the writing head in packets of toner and a predetermined number of packets are delivered to each pixel site.

21. The method of printing as in claim 17 including the step of measuring the actual amount of toner received by the write electrodes, and adjusting the remaining number or size of toner packets to deliver precisely the desired amount of toner to said pixel sites on the image receiving member.

22. The method of color printing with toners of different colors on a substrate comprising the steps of:
   conveying toners from a toner source of each color to a writing head having electrodes;
   selectively attracting toner to said electrodes on said writing head;
   positioning the substrate opposite said writing head;
   transferring toner from said writing head electrodes to pixel sites on said substrate during a print cycle; and
   controlling the amount of toner of each color attracted to writing head pixel positions during a print cycle to control the toner depth and color at said pixel sites.

23. A color printing apparatus for printing on an image receiving member comprising:
   toner particle sources of different colors;
   a particle conveyor means that conveys toner particles from loading points adjacent said toner particle sources to an imaging point, in response to control voltages;
   means to couple and decouple said toner sources to the particle conveyor means;
   an image writing member positioned opposite said imaging point with means to attract particles from said particle conveyor means, and then release them in response to control voltages to pixel sites on said image receiving member, wherein said image writing member includes one electrode for each of said corresponding pixel sites on the image writing member, and wherein said means for applying control voltages includes at least one integrated circuit with an output driver connected to each write electrode;
   an image receiving member adjacent said image writing member;
   means to transfer said released particles from the image writing member to corresponding pixel sites on said image receiving member; and
   means for applying control voltages to said particle conveyor means and said image writing member to deliver a predetermined amount of toner of each color to each of said corresponding pixel sites on the image receiving member, said integrated circuits include a charge sensing device at each output driver to measure the amount of toner received by said write electrode during an imaging cycle, thereby implementing a closed loop control system for accurately metering toner particles onto the receiving sheet.

* * * * *

UNITED STATES PATENT AND TRADEMARK OFFICE
CERTIFICATE OF CORRECTION

PATENT NO. : 5,287,127
DATED : February 15, 1994
INVENTOR(S) : Peter C. Salmon It is certified that error appears in the above-identified patent and that said Letters Patent is hereby corrected as shown below:

Column 1, line 53, change "each electrode" to --each aperture--

Column 9, line 1, change "Fig. 2, blank space 35" to --Fig. 4, blank space 55--

Column 13, line 31, change "requires" to --required--

Column 13, line 33, change "preformed" to --performed--

Column 15, line 1, change "preformed" to --performed--

Column 16, line 54, after "electrodes" insert --comprises means to apply control voltages to said write electrodes--

Signed and Sealed this

Eleventh Day of October, 1994

Attest:

BRUCE LEHMAN

Attesting Officer     Commissioner of Patents and Trademarks